United States Patent
Mehregany et al.

(10) Patent No.: US 7,130,802 B1
(45) Date of Patent: Oct. 31, 2006

(54) SYSTEMS AND METHODS FOR FACILITATING RESEARCH AND DEVELOPMENT

(75) Inventors: Mehran Mehregany, Chagrin Falls, OH (US); Kaigham J. Gabriel, Pittsburgh, PA (US)

(73) Assignee: NineSigma, Inc., Beachwood, OH (US)

( * ) Notice: Subject to any disclaimer, the term of this patent is extended or adjusted under 35 U.S.C. 154(b) by 458 days.

(21) Appl. No.: 09/677,197

(22) Filed: Oct. 2, 2000

(51) Int. Cl.
G06Q 99/00 (2006.01)

(52) U.S. Cl. ............... 705/1; 705/7; 705/9; 705/80; 707/3; 707/4

(58) Field of Classification Search ............ 705/80, 705/1, 37, 7, 9; 707/3, 4
See application file for complete search history.

(56) References Cited

U.S. PATENT DOCUMENTS

| | | | |
|---|---|---|---|
| 4,984,155 A | | 1/1991 | Geier et al. |
| 4,992,940 A | | 2/1991 | Dworkin |
| 5,592,375 A | * | 1/1997 | Salmon et al. ............ 705/7 |
| 5,615,269 A | * | 3/1997 | Micali .................... 705/80 |
| 5,717,989 A | * | 2/1998 | Tozzoli et al. ............ 705/37 |
| 5,742,776 A | * | 4/1998 | Toda ...................... 705/1 |
| 5,794,204 A | * | 8/1998 | Miyazawa et al. ......... 704/275 |
| 5,794,207 A | * | 8/1998 | Walker et al. ............ 705/1 |
| 5,924,082 A | * | 7/1999 | Silverman et al. ........ 705/37 |
| 5,974,403 A | * | 10/1999 | Takriti et al. ........... 705/412 |
| 6,038,537 A | | 3/2000 | Matsuoka |
| 6,249,769 B1 | * | 6/2001 | Ruffin et al. ............. 705/7 |
| 6,249,796 B1 | * | 6/2001 | Chickering ............... 708/300 |
| 6,260,024 B1 | * | 7/2001 | Shkedy ................... 705/37 |
| 6,304,861 B1 | * | 10/2001 | Ferguson ................. 706/10 |
| 6,356,909 B1 | * | 3/2002 | Spencer .................. 707/10 |
| 6,466,919 B1 | * | 10/2002 | Walker et al. ............ 705/37 |
| 6,535,880 B1 | | 3/2003 | Musgrove et al. |
| 6,574,608 B1 | * | 6/2003 | Dahod et al. ............. 705/26 |
| 6,598,026 B1 | | 7/2003 | Ojha et al. |
| 2001/0042056 A1 | * | 11/2001 | Ferguson ................. 706/10 |
| 2002/0091541 A1 | * | 7/2002 | Lundberg ................. 705/1 |

FOREIGN PATENT DOCUMENTS

| | | |
|---|---|---|
| EP | 0 697 669 A2 | 2/1996 |
| EP | 0 855 687 A2 | 7/1998 |
| WO | WO 01/71594 A1 * | 9/2001 |

* cited by examiner

Primary Examiner—Kambiz Abdi
(74) Attorney, Agent, or Firm—Matthew J. Evans; Squire, Sanders & Dempsey LLP

(57) ABSTRACT

The present invention provides a process and a system for matching buyers and sellers of goods and/or services for a project. The invention enables a buyer to specify a project in terms of physical, functional, temporal, financial, and/or transactional parameters (102) which are then automatically converted, by the present invention, into at least one request for goods/services (104) needed to complete the project. The requests are suitably provided to at least one seller, who may be pre-identified by the buyer as a preferred seller. Upon receiving a request, the seller may submit a response to the request, as desired. Additionally, the invention provides a forum for the negotiation of any agreements and the formation of contracts to provide the requested, or alternative goods/services (106). Further, the present invention provides a system and process for targeting marketing to online buyers based upon profiles established for the buyers, profiles for the sellers, and the current on-line activities of a buyer. The targeted marketing features are preferably provided by utilizing Profile links which provide hyper links to a web page associated with a seller.

13 Claims, 8 Drawing Sheets

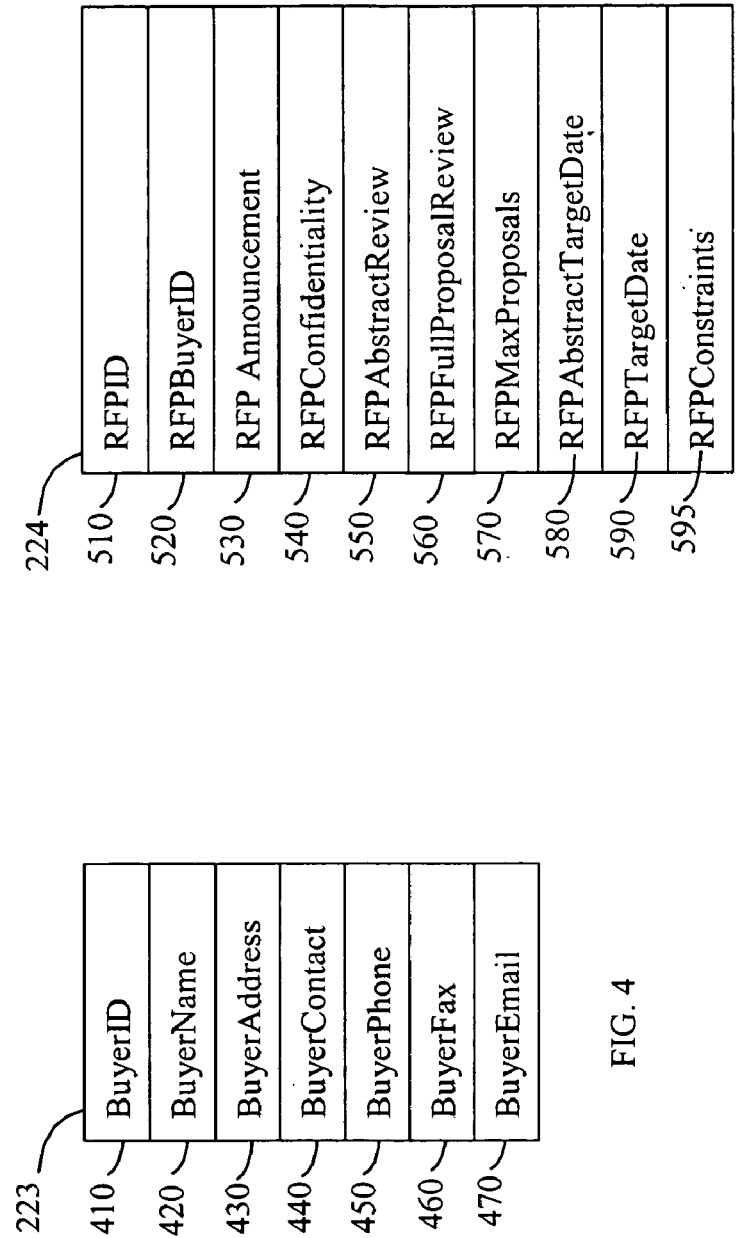

700

Search [optical AND filtering] [5 ▼]

http://www.unex.ucla.edu/shortcourses/
BODY ( MARGIN: -8px 0px 0px -8px ) Welcome, click here to continue.

http://www.hpl.hp.com/israel/staff/me.html
MICHAEL ELAD - RESUME Personal Information Education Fields of Interest Awards Journal Publications Recent Conference Presentations HPL Technical Reports Personal Information Affiliation: Hewlett-Packard Labs - Israel - Technion City, Haifa http://www.arl.psu.edu/areas/electroptics/dspi.html
ELECTRO-OPTICS Karl M. Reichard (814) 863-7681 kmr5@psu.edu Electro-Optics Thrust Areas Publications Facilities Staff DSPI TECHNIQUES (Digital Shearography and Holography) Portable Digital Shearography for NDI Digital shearography falls in http://www.ee.uconn.edu/~ospclab/
Image Processing and Optical Computing Lab  Dr. Bahram Javidi , Director   The Image Processing and Optical Computing laboratory of the University of Connecticut offers Master's and PH.D. Programs on the following subjects: Image Processing:

http://www-ee.stanford.edu/%7Egoodman/phd.html
Ph.D. Students of J.W. Goodman Year Name 1967 Gordon R. Knight (Chief Technical Officer, Terastor, Inc.) Effects of nonlinearities in wavefront reconstruction imaging 1968 Jack D. Gaskill (Professor Emeritus, Optical Sciences Center, Univ. Ariz Next Records: 1-5 of 911
Total Records In Database: 1813697

Search | wavelength AND division | 5 | http://www.alcatel.com/telecom/mbd/publi/atr3_98/abb.htm
Alcatel Telecom Review 3Q 1998   A ABM2 Advanced Buffer Material ACTS Advanced Communication Technologies and Services ADM Add-Drop Multiplexer ADSL Asymmetric Digital Subscriber Line ADSS Dielectric Self-Supported ALC Automatic Level Control http://www.lucent-optical.com/
A:Hover {text-decoration : underline; color : #FF0000}    resources global vision solutions news events training careers search glossary feedback December 1, 1999 NARUS teams with Lucent Technologies to deliver industry's first IP Business Infrastruc http://www.tellabs.com/news/97news/nr011597.shtml
More Options News && Information News Release Tellabs Clear Ideas FOR IMMEDIATE RELEASE 1/15/97 TELLABS ACQUIRES OPTICAL NETWORKING TECHNOLOGY FROM IBM Development Team and Patents from Thomas J. Watson Research Center To Form Bas http://www.alcatel.com/telecom/mbd/publi/atr2_99/abb.htm
Back to the homepage/Retour à la page d'accueil   Contents Editorial Subscription Credits Other issues Up Down Up Down Up Down Up Down Up Down Up Down Up Down Reliability, Real-Time and Multimedia IP: the all-In-one communication Protocol A AA Automatic Att http://www.alcatel.com/telecom/mbd/publi/atr3_99/abb.htm
Back to the homepage/Retour à la page d'accueil   Contents Editorial Subscription Credits Other issues Up Down Up Down Up Down Up Down Up Down Up Down Up Down FROM INNOVATION TO PEOPLE A AAA Authentication, Authorization and Accounting AAL2 ATM Adaptation Next Records: 1-5 of 314
Total Records In Database:1813697

FIG. 8

SYSTEMS AND METHODS FOR FACILITATING RESEARCH AND DEVELOPMENT

BACKGROUND OF THE INVENTION

1. Field of the Invention

The invention relates to the acquisition of research and development expertise, personnel, facilities, and resources through the use of requests for proposal.

2. Background

In the non-profit and government sector, matching research and development (R&D) needs with the personnel and organizations able to deliver such R&D solutions and resources traditionally involves the following multi-step procurement process: (1) a suitable request for proposal (RFP) is created to identify the research and development needs; (2) the RFP is advertised publicly and broadly to attract research and development providers; (3) interested research and development providers submit proposals, or bids, on fulfilling the needs; (4) the submitted proposals are evaluated based on published criteria; and (5) one or more proposals are selected for funding.

For a number of reasons, this traditional procurement process is problematic for use in the private sector. If an R&D buyer (hereinafter to mean any individual or organization interested in acquiring R&D expertise, personnel, facilities or resources) in the private sector were to use an RFP in the conventional way, the public distribution of the RFP tends to inform the entire R&D community as to which R&D buyers are interested in what types of R&D. Furthermore, the detailed information in an RFP can make the specifics of innovative technology and/or science known to the entire R&D community. Thus, a private entity's business strategy and intellectual property can be made vulnerable by the traditional procurement process. Further, the fear of competition inhibits the information flow inherent in and critical to the proper execution of the traditional procurement process.

Likewise, R&D suppliers (hereinafter to mean any individual or organization interested in providing R&D expertise, personnel, facilities or resources) not only have no assurance that the effort and costs associated with developing a proposal in response to the RFP will be rewarded by a private sector R&D buyer, but the ideas and solutions presented in an R&D supplier's proposal can themselves be valuable intellectual property to the R&D supplier that would be made vulnerable by disclosure. Because of the difficulty in identifying qualified R&D suppliers, the difficulty of publicly advertising R&D buyer needs, and that the intellectual property of both R&D buyers and suppliers can be made vulnerable through mutual, unprotected disclosures, the traditional procurement process has not and cannot be used in the private sector and the state of the private sector R&D community is one of a community with fragmented R&D buyers and suppliers.

Public and government agencies, such as the Whitaker Foundation and the National Science Foundation, facilitate the operation of the traditional procurement process by providing an interface to the R&D community (in the case of the government, for example, by publishing in the Commerce Business Daily or CBD), matching R&D suppliers with public and government R&D needs. However, companies in the private sector do not have such a public and broadly referenced interface to facilitate matching R&D needs and sources. Further, the requirements for matching private sector R&D buyers with R&D suppliers can be more varied and complex than those involved in the public sector. As a result, companies in the private sector are disadvantaged financially and logistically in acquiring external R&D and leveraging internal R&D.

Because of these reasons and the lack of any standards or metrics for R&D quality, the private sector's search and acquisition of R&D resources is typically inefficient, time-consuming and ad hoc.

SUMMARY OF THE INVENTION

The present invention facilitates obtaining one or more proposals for research and development (R&D). A clear understanding of the type of R&D project and its associated technology supports the creation of a request for proposal, the creation of criteria for searching one or more supplier databases for one or more potential R&D suppliers, and the creation of criteria for evaluating each potential R&D supplier located on one or more supplier database(s).

The one or more supplier databases include information about researchers and research organizations worldwide. Preferably, different supplier databases house this information for different general areas of R&D. The supplier database(s) is indexed by every word that is not an article or preposition, to allow fast, yet comprehensive searching.

Once the search of the supplier database(s) locates potential R&D suppliers, the evaluation criteria are applied to each to identify qualified R&D suppliers. Bids for proposal are only solicited from qualified potential R&D suppliers. Optionally a review panel can be assembled to provide assistance in evaluating and qualifying potential R&D suppliers, as well as in evaluating submitted proposals. Further, feedback is provided R&D suppliers so that they have an opportunity to modify and resubmit proposals.

In this manner, the present invention provides a system that enables quick, efficient, effective, comprehensive, interactive and confidential identification, qualification and matching of R&D buyers with R&D suppliers.

BRIEF DESCRIPTION OF THE DRAWING

The preferred exemplary embodiment of the present invention will hereinafter be described in conjunction with the appended drawing, where like designations denote like elements, and:

FIG. 4 is a block diagram of an exemplary embodiment of a buyer database record;

FIG. 5 is a block diagram of an exemplary embodiment of an RFP record;

FIG. 7 is an example of a search results list screen layout;

FIG. 8 is another example of a search results list screen layout; and

DETAILED DESCRIPTION OF A PREFERRED EXEMPLARY EMBODIMENT

Figure 1:
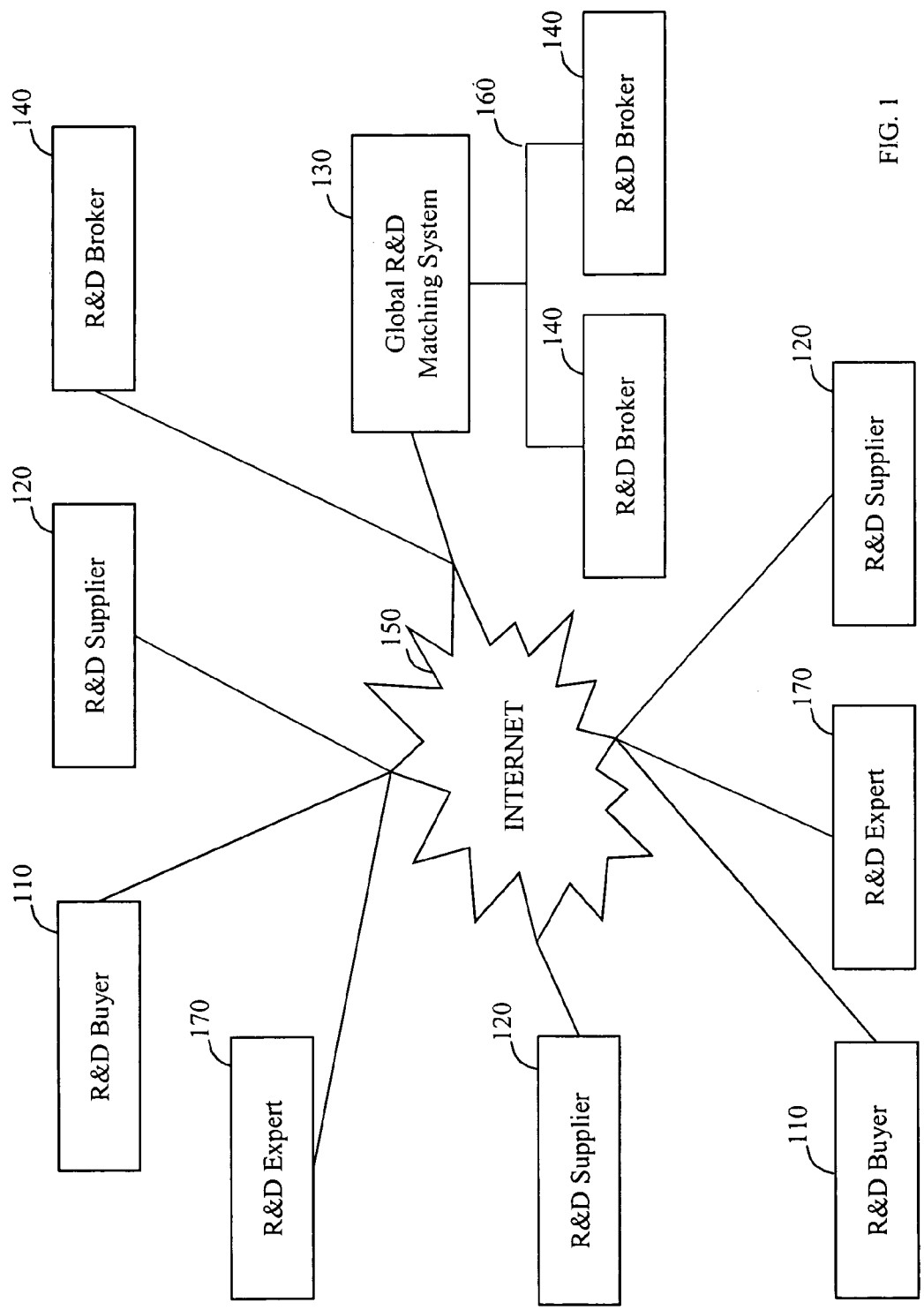
FIG. 1 is a network diagram showing a global research and development (R&D) matching system according to an exemplary embodiment of the present invention in communication with R&D buyers, suppliers, experts, and brokers.

Referring now to FIG. 1, a global research and development (R&D) matching system 130 communicates with a plurality of participants, e.g. R&D buyers 110, R&D suppliers 120, R&D brokers 140, and R&D experts 170. Such communications are effected via suitable media, preferably a global communications network, such as the Internet 150, and/or a local area network 160 or other suitable local communications media.

The R&D buyers 110 employ the methods of the present invention to obtain R&D from worldwide R&D suppliers 120. R&D buyer hereinafter refers to any individual or organization interested in acquiring R&D expertise, personnel, facilities or resources. Examples of R&D buyers include companies, private non-profit organizations, government laboratories, consultants, law firms, and venture capital firms. R&D supplier hereinafter refers to any individual or organization interested in providing R&D expertise, personnel, facilities or resources. Examples of R&D suppliers include researchers and research organizations, including companies, universities, consultants, government laboratories, and private non-profit organizations. R&D suppliers might supply R&D services, personnel, equipment, materials, facilities, and/or intellectual property rights.

Research and development (R&D) brokers 140 work with an R&D buyer 110 throughout the process of obtaining R&D from worldwide R&D suppliers 120. R&D Brokers 140 are preferably skilled in the art of preparing a request for proposal (RFP), and in the area of technology pertaining to the RFP. In this manner, R&D brokers 140 are able to assist an R&D buyer 110 by efficiently preparing an RFP announcement that will yield proposals from R&D suppliers that are specifically geared to the R&D being sought. Further R&D brokers 140 can assist an R&D buyer in evaluating proposals to obtain the correct mix of R&D services and supplies needed. R&D brokers 140 provide their services confidentially to protect an R&D buyer's 110 business interests and intellectual property rights. R&D brokers 140 preferably provide their services for a commission, typically a percentage of the R&D buyer's total budget for the desired research activity (though it is understood that the commission may be appropriately adjusted to reflect the amount of brokering work required).

R&D broker 140 assists R&D buyer 110 to identify the specific and general objectives of the research activity to be funded. R&D broker 140 distills the information into a customized and targeted request for proposal (RFP), as well as a customized set of criteria that will be used to evaluate potential R&D suppliers 120. R&D brokers 140 employ matching system 130 to search for potential R&D suppliers 120 and employ R&D buyer's evaluation criteria to select a list of potential R&D suppliers 120.

R&D broker 140 works with R&D buyer 110 to finalize a list of qualified R&D suppliers. R&D broker 140 contacts each of the qualified R&D suppliers 120 to distribute the RFP announcement and to solicit proposal bids. Because bids for proposals are solicited only from qualified R&D suppliers 120, the methods of the present invention allow R&D buyers to obtain R&D services without alerting certain R&D community players (or the entire R&D community) to the nature of the R&D services sought. Further, the methods of the present invention ensure that R&D buyers will get proposal abstracts and/or proposals from the best-qualified R&D suppliers. R&D suppliers 120 also benefit from the methods of the present invention, since the R&D brokers 140 are neutral trustable intermediaries that facilitate the interaction and business dealings between the R&D buyers and R&D suppliers (for example, in some cases the R&D broker is the recipient of a proposal on behalf of the R&D buyer to provide additional confidentiality and anonymity for the R&D buyer or the R&D supplier). Furthermore, unlike the traditional public sector and government process, R&D suppliers 120 also benefit from the methods of the present invention since the R&D brokers 140 can provide timely feedback about the R&D supplier's proposal and give the R&D supplier 120 an opportunity to modify the proposal (for example: modify the scope of the project by eliminating certain proposed tasks not of interest to the R&D buyer; or accelerate the timeline or the proposal project) and resubmit the modified proposal. The ability of the R&D suppliers 120 to interactively modify proposals based on feedback and recommendations from the R&D broker 140: (1) increases the quality of a proposal and the likelihood of funding for a proposal submitted by an R&D supplier 120, and (2) improves the quality of the submitted proposals solicited by the R&D buyer 110 in a particular RFP. The methods of the present invention enable this by using an RFP process that has included in it an explicit proposal feedback, modification, and resubmission stage.

Figure 2:
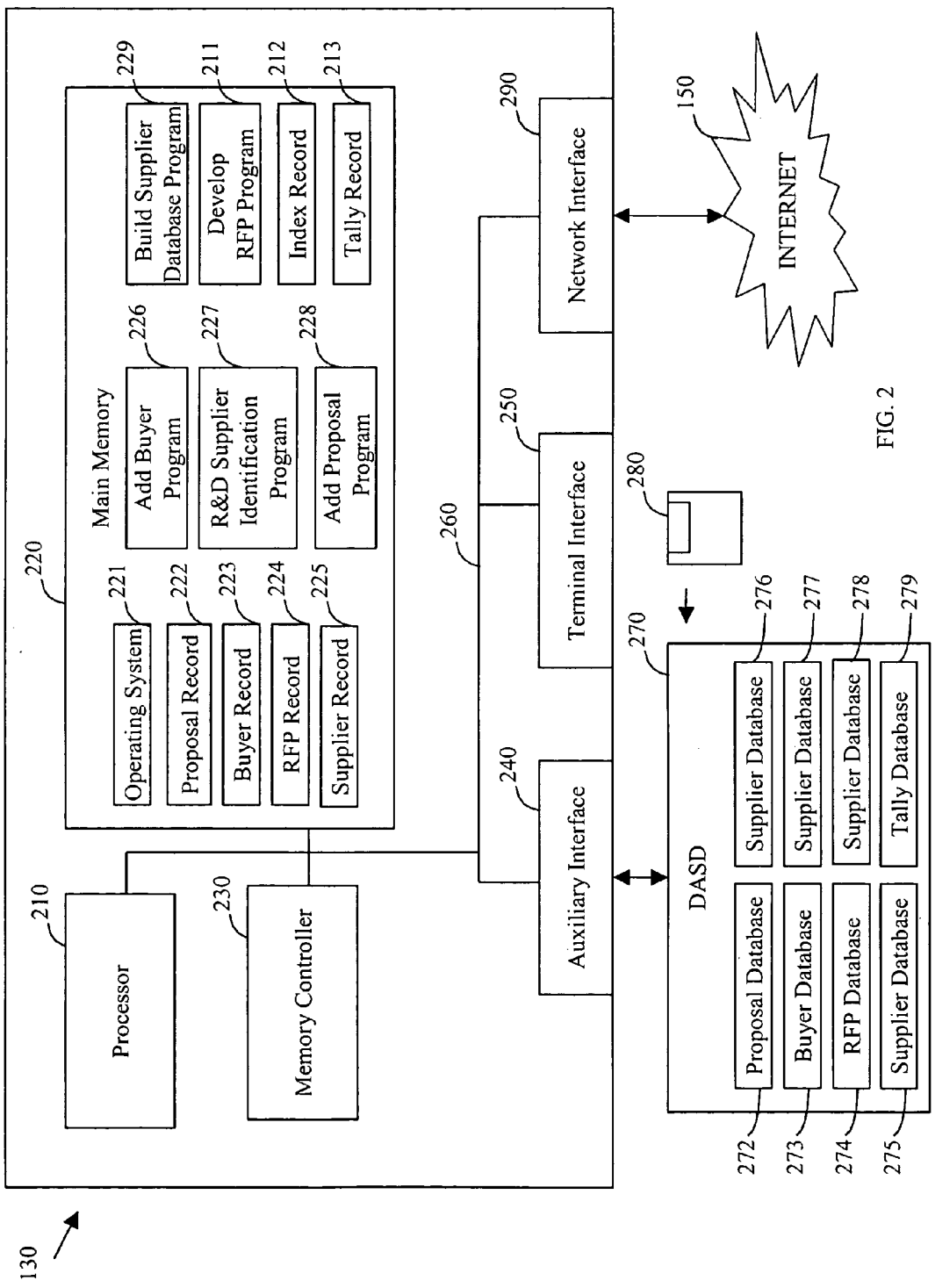
FIG. 2 is a block diagram of a computer system suitable for use in implementing an exemplary embodiment of the present invention.

Referring now to FIG. 2, global R&D matching system 130 suitably comprises, e.g., a processor 210, main memory 220, a memory controller 230, an auxiliary storage interface 240, a terminal interface 250, and a network interface 290, all of which are interconnected via a system bus 260. The computer system employed by matching system 130 may be implemented by any system capable of administering functions such as Web serving, database management, and telecommunications. Although computer system 130 depicts a particular configuration of components, those skilled in the art will appreciate that the method and apparatus of the present invention apply equally to any computer system, regardless of whether the computer system is a complicated multi-user computing apparatus or a single user device such as a personal computer or workstation.

Processor 210 performs computation and control functions of computer system 200, and comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor. Processor 210 suitably executes computer applications within main memory 220.

Auxiliary storage interface 240 allows computer system 200 to store and retrieve information from auxiliary storage devices, such as magnetic disk (e.g., hard disks or floppy diskettes) or optical storage devices (e.g., CD-ROM). One suitable storage device is a direct access storage device (DASD) 270, which may be a floppy disk drive that is capable of reading programs and data from a floppy disk 280. It should be noted that the term "storage device" herein will be used to collectively refer to all types of storage devices, including disk drives, optical drives, tape drives, etc. While the present invention has been (and will continue to be) described in the context of a single computer system, the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 280) and CD ROMS, and transmission type media such as digital and analog communication links, including wireless communication links.

Memory controller 230, through use of a processor is responsible for moving requested information from main memory 220 and/or through auxiliary storage interface 240 to processor 210. While for the purposes of explanation, memory controller 230 is shown as a separate entity, those skilled in the art understand that, in practice, portions of the function provided by memory controller 230 may actually reside in the circuitry associated with processor 210, main memory 220, and/or auxiliary storage interface 240.

Terminal interface 250 allows system administrators, computer programmers, and preferably R&D brokers 140 to communicate with computer system 130, normally through programmable workstations. Although the system 130 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports-directional communication in a computer-related environment could be used.

Network interface 290 supports the transfer of information between computer system 200 and remote computer systems, such as a computer system employed by an R&D supplier 120, buyer 110, expert 170, or broker 140. Examples of a network interface adapter include Peripheral Component Interconnect (PCI) expansion cards, Industry Standard Architecture (ISA) expansion cards, proprietary adapter cards, and any types of adapters known now or invented in the future. Those skilled in the art will recognize that the functionality of network interface 290 can be implemented directly as part of main memory and processor 210.

In the preferred embodiment, various databases, database records and software applications (routines) reside in main memory 220 and/or DASD 270, and suitably include: a proposal database 272, a buyer database 273, a request for proposal (RFP) database 274, multiple supplier databases 275–278, a tally database 279, a proposal record 222, a buyer record 223, a request for proposal (RFP) record 224, a supplier record 225, an add buyer program 226, an supplier identification program 227, an add proposal program 228, a build supplier database program 229, a develop RFP program 211, an index record 212, and a tally record 213. For convenience of reference, such database records and software applications are briefly described in Table 1.

TABLE 1

| Database, Record, or Application | General Content/Function |
|---|---|
| Proposal Database 272 | Proposal database 272 houses a proposal record 222 for each qualified R&D supplier 120 to keep track of communications between the R&D buyer 110, the R&D broker 140, and the R&D supplier 120 during the RFP process. |
| Buyer Database 273 | Buyer database 273 houses a buyer record 223 for each R&D buyer 110 that employs an R&D broker 140 to assist in locating an R&D suppler 120. |
| RFP Database 274 | Request for proposal (RFP) database 274 houses an RFP record 224 for each request for proposal. |
| Supplier | Each supplier database 274–278 houses supplier |

TABLE 1-continued

| Database, Record, or Application | General Content/Function |
|---|---|
| Databases 275–278 | records 225 for R&D suppliers 120 that offer R&D in a particular area of technology. For instance, supplier database 274 might contain supplier records 225 for R&D suppliers 120 that can provide R&D services and supplies in the area of polymers. Each supplier database 274–278 houses a supplier record 225 for as many R&D suppliers 120 as can be located on Internet 150 by Build Supplier Database Program 229. Supplier database 274 is indexed on and searchable by unique keywords located within the Web pages belonging to R&D suppliers 120. Supplier databases 274–278 and their associated indices are continuously updated by Build Supplier Database Program 229 to maintain a complete and accurate list of researchers and research organizations worldwide in a particular area of technology. |
| Tally Database 279 | Tally database is employed by supplier identification program 227 to order potential R&D Suppliers 120. |
| Proposal Record 222 | Proposal records 222 are housed on proposal database 272. A proposal record 222 is created for each R&D supplier 120 selected to submit a proposal for an R&D buyer 110. Subsequently, when the R&D supplier 120 associated with a particular proposal record 222 submits either an abstract or full proposal, Add Proposal Program 212 updates the proposal record 222 with the proposal information. |
| Buyer Record 223 | Buyer records 223 are housed on buyer database 273. Buyer records are created by Add Buyer Program 226 to contain information about the R&D buyer 110. |
| RFP Record 224 | Request for Proposal (RFP) records 224 are housed on RFP database 274. RFP records 224 are created by Develop RFP Program 211 to contain sufficient information about the R&D desired to solicit a bid from a group of R&D suppliers 120 and to house criteria with will assist R&D broker 140 in qualifying potential R&D suppliers 120. |
| Supplier Record 225 | Supplier records 225 are housed on supplier databases 275–278. Supplier records 225 are created by Build Supplier Database Program 229 to contain sufficient information to qualify an R&D supplier to be selected to submit a bid for a particular R&D buyer's RFP. |
| Add Buyer Program 226 | Add Buyer Program 226 is employed to add information about an R&D buyer 110 to buyer database 273. |
| Supplier Identification Program 227 | Supplier identification program 228 is employed by R&D broker 140 to search one or more supplier databases 275–278 for potential R&D suppliers 120. Supplier identification program can also be employed to search one or more supplier databases 275–278 for qualified R&D experts 170 |
| Add Proposal Program 228 | Add proposal program 228 is employed to track information flow between qualified R&D suppliers 120 and the R&D buyer 110. |
| Build Supplier Database Program 229 | Build Supplier Database Program 229 creates multiple supplier databases 274–278. Program 229 creates a supplier database that is specific to a given technical field, such as polymers, by focusing its search of Internet 150 for specified information. Program 229 searches for content on Web pages that identifies R&D suppliers 120 within the specified technical field. |
| Develop RFP Program 211 | Develop RFP program 211 is employed to add information to RFP database 274 that is specific to the RFP and to the evaluation criteria used to qualify potential R&D suppliers 120. |
| Index Record 212 | There are index records 212 for in each index of each supplier database 275–278. |
| Tally Record 213 | A tally record 213 is created for each potential R&D supplier 120 and is employed by supplier identification program 227 to order the potential R&D suppliers 120. |

It should be understood that the term memory is used herein in its broadest sense, and can include Dynamic Random Access Memory (DRAM), Static RAM (SRAM), flash memory, cache memory, etc. Additionally, memory 220 can comprise a portion of a disk drive use used as a swap file. While not explicitly shown in FIG. 2, memory 220 may be a single type of memory component or may be composed of many different types of memory components. For example, memory 220 and processor 210 may be distributed across several different computers that collectively comprise system 130. It should also be understood that programs in memory 220 can include any and all forms of computer programs, including source code, intermediate code, machine code, and any other representation of a computer program.

The various databases that are accessible by computer system 130 are preferably indexed to suit the needs of the computer applications running on computer system 130. For example, many indices exist for each of the supplier databases 275–278. Further, although proposal database 272, buyer database 273, RFP database 274, supplier databases 275–278, and tally database 279 are shown as residing on DASD 270, those databases and/or the indices associated with each of them might alternatively reside in main memory 220, or on any other type of auxiliary storage. It should be noted that generally only portions of the databases are resident in main memory 220, as needed to support computer applications operating in main memory 220.

Figure 3:
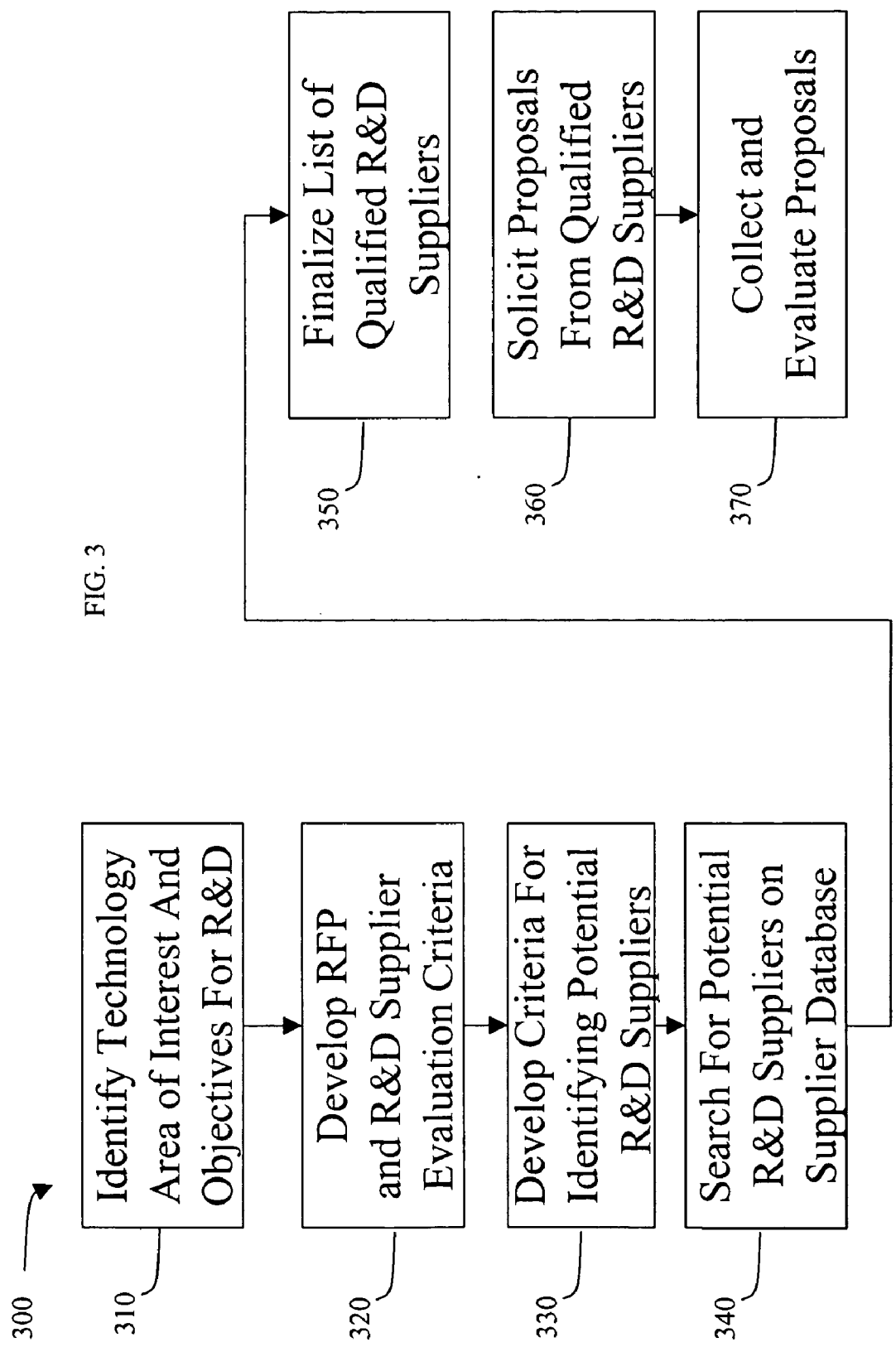
FIG. 3 is an overview flowchart of the methods of the present invention.
Figure 6:
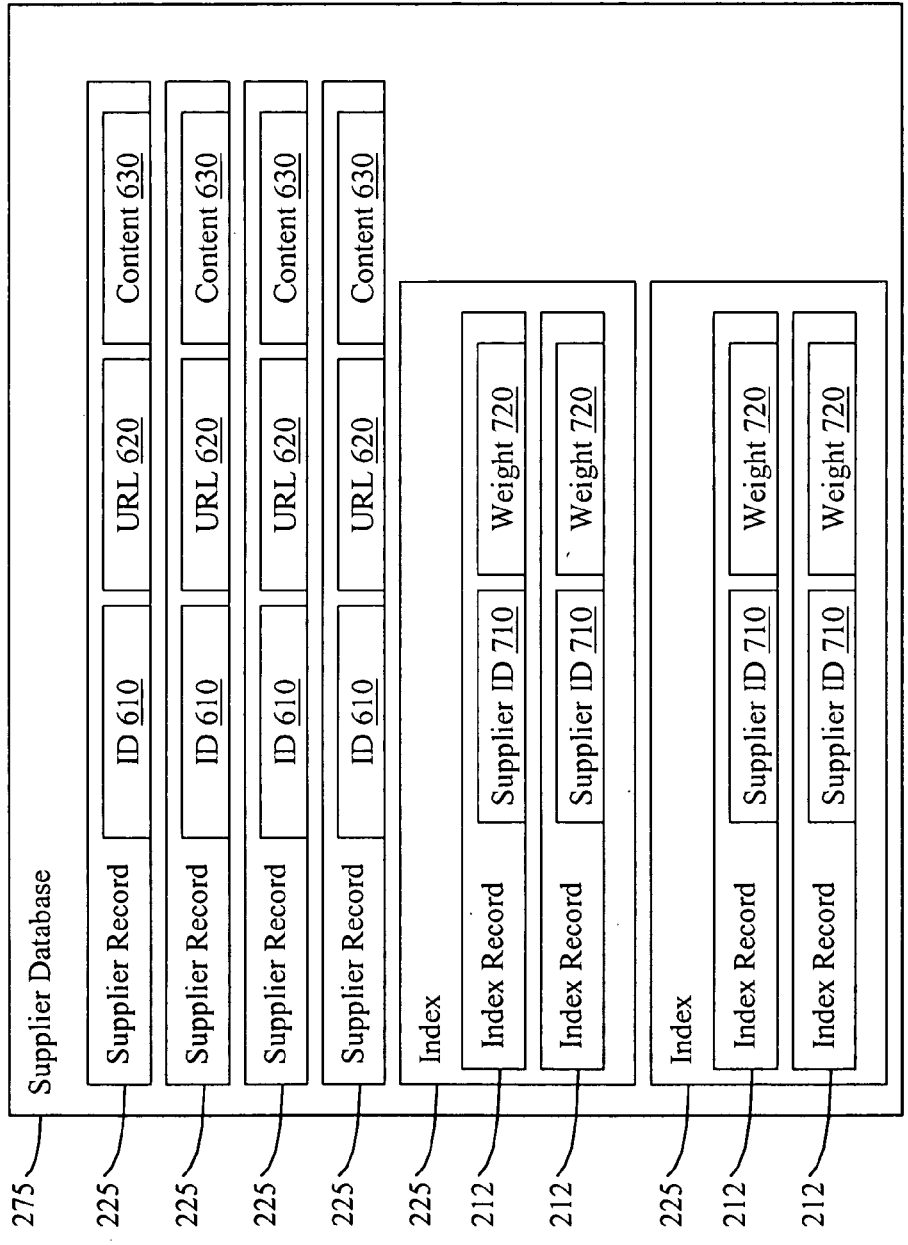
FIG. 6 is a block diagram of an exemplary embodiment of an R&D supplier database.
Figure 9:
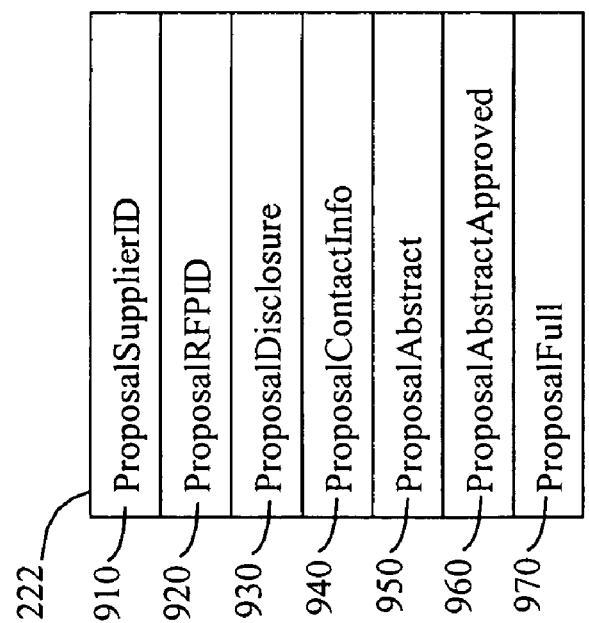
FIG. 9 is an example of a block diagram of a proposal record.

The various computer applications residing in main memory 220 assist in matching R&D suppliers 120 with R&D buyers 110. Referring also now to FIG. 3, an R&D buyer 110 contacts R&D broker 140 to initiate the request for proposal (RFP) process 300. In general, process 300 suitably comprises: identifying the technology area of interest and objectives with respect to the particular R&D project (step 310); developing an RFP announcement and suitable supplier evaluation criteria (step 320); developing criteria for searching one or more supplier databases (step 330); searching for potential suppliers on one or more supplier databases (step 340); finalizing the list of qualified suppliers (step 350); soliciting proposals from the qualified suppliers (step 360) and collecting and evaluating the proposals (step 370).

In the exemplary embodiment, each R&D buyer preferably has a buyer record 223 on buyer database 273. Buyer record 223 suitably includes information about each R&D buyer 110, such as name 420, address 430, and contact information 440–470. Because a particular R&D buyer 110 might have the need for multiple R&D projects, there potentially exists a one-to-many relationship between an R&D buyer 110 and R&D projects. For that reason, information regarding a specific R&D project is preferably housed on a separate RFP database 274, and each buyer record 223 preferably includes only general information about the R&D buyer 110, as set forth in Table 2.

TABLE 2

| | | |
|---|---|---|
| 410 | BuyerID | The system number assigned to this R&D buyer |
| 420 | BuyerName | The name of the R&D Buyer |
| 430 | BuyerAddress | First line of the mailing address of the R&D buyer |
| 440 | BuyerContact | Name of R&D buyer contact working with R&D broker. |
| 450 | BuyerPhone | Phone number of BuyerContact. |
| 460 | BuyerFax | Fax number of BuyerContact |
| 470 | BuyerEmail | E-mail address of BuyerContact |

In the exemplary embodiment, R&D broker 140 employs Add buyer program 226 to enter data about R&D buyer 110 onto buyer database 273. Add buyer program 226 suitably prompts R&D broker 140 for the buyer's name 420, address 430, and contact information 440–470. Further, add buyer program assigns a unique BuyerID 410 to buyer 110. Add buyer program 226 then formats the fields on buyer record 223, and adds the buyer record 223 to buyer database 273. Add buyer program 226 is capable of supporting updates to the information stored on buyer record 223, and provides management reporting of R&D buyers 110. For instance, add buyer program 226 can selectively print out information about R&D buyers 110 having buyer records 223 on buyer database 273. Alternatively, the methods of the present invention can be accomplished without an add buyer program 226, or without a buyer database 273.

R&D broker 140 is preferably skilled in the area of technology applicable to the R&D buyer's desired R&D, skilled at writing requests for proposals, and skilled in the management of multi-project R&D efforts. R&D broker elicits questions to support R&D buyer 110 in developing a clear understanding of the technology area for the R&D, as well as the specific and general objectives of the research activity to be funded (step 310).

Consider the following example regarding the development of a clear understanding of the area of technology. Suppose an R&D buyer 10 is interested in researching "tunable optical filters." Preferably, R&D broker 140 understands the current state of technology in the area of optical filtering, and can suggest to R&D buyer 110 the type of information to put in a request for proposal (RFP) announcement that would attract the specific type of R&D proposals that R&D buyer needs. R&D broker 140 can thereby efficiently assist R&D buyer 110 in the preparation of a request for proposal announcement that will attract bids from R&D suppliers 120 skilled in optical filtering research and/or R&D suppliers 120 that can provide supplies and other types of support for this research.

In the exemplary embodiment, each R&D project for which a request for proposal is written has an RFP record on RFP database 274. RFP record suitably includes information about each R&D project, such as buyer 520, a copy of the request for proposal announcement 530 to be sent out to qualified R&D suppliers, indicators 540 about the confidentiality of the R&D project, the identity or qualifications of reviewers 550 and 560 of the submitted proposals, target quantity 570 of proposals, target dates 580 and 590 for proposals, and evaluation criteria 595 for proposals, as set forth in Table 3.

TABLE 3

| | | |
|---|---|---|
| 510 | RFPID | The system number assigned to this RFP |
| 520 | RFPBuyerID | The buyer associated with this RFP |
| 530 | RFPAnnouncement | The content that will be distributed to qualified R&D suppliers. |
| 540 | RFPConfidentiality | Indication of whether a qualified R&D supplier needs to execute a non-disclosure agreement prior to receipt of RFP Announcement. |
| 550 | RFPAbstractReview | Indication of what entity will review the proposal abstracts from qualified R&D suppliers |
| 560 | RFPFullProposalReview | Indication of what entity will review the full proposals from qualified R&D suppliers |
| 570 | RFPMaxProposals | Maximum quantity of proposals that buyer wants to review (or have reviewed). |

TABLE 3-continued

| | | |
|---|---|---|
| 580 | RFPAbstractTargetDate | Length of time in which qualified R&D suppliers will be given to submit proposal abstracts. This date is preferably zeroed out to indicate that no abstract proposals will be solicited, and instead, only full proposals will be solicited. |
| 590 | RFPTargetDate | Length of time in which qualified R&D suppliers will be given to submit full proposals. |
| 595 | RFPConstraints | Other constraints that R&D broker that determine whether a potential R&D Supplier should be considered qualified. |

In the exemplary embodiment, as R&D broker 140 obtains information from R&D buyer 110 specifically about its R&D project, R&D broker 140 employs develop RFP program 211 to enter information specifically about R&D buyer's project onto a RFP record 224 on RFP database 274. Develop RFP program 211 suitably prompts R&D broker 150 for buyer identification 520, a copy of the RFP announcement 520, confidentiality measures 540, review panel information 550 and 560, target number of proposals to solicit 570, timeframe for proposal submission 580 and 590, as well as evaluation criteria 595 that will be used to qualify potential R&D suppliers and to evaluate proposal abtracts and full proposals.

Develop RFP program 211 suitably assigns a unique id 510 to the R&D project, formats an RFP record 224 from the entered information and adds the RFP record 224 to RFP database 274. Develop RFP program 211 is capable of supporting updates to the information stored on RFP record 224, and capable of providing management reporting of RFP projects. For instance, develop RFP program 211 is suitably used by R&D broker 140 to keep track of target dates for the active R&D projects. Alternatively, the methods of the present invetion can be accomplished without a develop RFP program 211 or an RFP database 274.

A typical R&D announcement includes research objectives and description, program scope, general information, and evaluation criteria, as shown in Table 4.

TABLE 4

Request for Proposal
Wavelength-Tunable Optical Filters NineSigma RFP# 00–01
RFP OBJECTIVES AND DESCRIPTION
Increasing bandwidth demand is both a growing and continuing need in telecommunication. The ability to effectively partition and make use of this increasing bandwidth is key to reliable and profitable delivery of voice
and data communication services. Wavelength Division Multiplexing (WDM) and Dense Wavelength Division Multiplexing (DWDM) are the preferred methods of bandwidth partitioning employed today by major telecommunications firms and network services providers. Conventional methods of tuning between different partitions (wavelengths) are limited to a few wavelengths and are costly (~$1000/filter), unreliable (mean time between failures of ~200 hours), with moderate insertion loss (~5 dB/filter), and typically require conversion from an optical to an electrical signal during the filtering stage.
NineSigma seeks innovative proposals to develop wavelength-tunable optical filters that are scalable (~100's to 1000's of individual wavelengths), cost-effective (100x lower in cost than conventional methods), robust (10–100x increase in mean time between failures) and with lower insertion loss (<1 dB/filter). NineSigma is particularly interested in receiving proposals that address the following areas: (1) all-optical wavelength tuning methods that obviate the optical-electrical-optical conversion step; (2) wavelength tuning methods that employ CMOS-compatible, optical microelectromechanical components and arrays (optical MEMS); and (3) system demonstrations of the wavelength-tunable filter approaches above over fiber optic lines carrying live or simulated

TABLE 4-continued data/voice traffic. Additional information on these technology areas is provided in the Areas of Interest section of REP 00–01 Proposer Information Pamphlet.
PROGRAM SCOPE
Awards totaling approximately $7 million over three years are expected to be made by the fourth quarter of calendar year 2000. Multiple awards are anticipated. Collaborative efforts/teaming and cost sharing are encouraged. The technical POC for this effort is Dr. Kaigham J. Gabriel, fax: (412) 222-2222, electronic mail: kgabriel@ninesigma.com.
Administrative contact is Ms. Sandy L. Rocco, fax: (412) 222-2223, electronic mail: srocco@ninesigma.com.
GENERAL INFORMATION
Proposers must obtain a pamphlet entitled "NineSigma RFP 00–01, Wavelength-Tunable Optical Filters, Proposer Information Pamphlet" which provides further information on wavelength-tunable optical filter technologies being sought and associated system demonstrations, the submission, evaluation, and funding processes, proposal abstract formats, proposal formats, and other general information. This pamphlet may be obtained from the World Wide Web (WWW) or by fax, electronic mail, or mail request to the administrative contact address given below. NineSigma reserves the right to not review proposals not meeting the format described
in the pamphlet. In order to minimize unnecessary effort in proposal preparation, proposers are strongly encouraged to submit proposal abstracts in advance of full proposals. An original and four (4) copies of the proposal abstract must be submitted to NineSigma, P.O. Box 12521, Pittsburgh, PA 15241 (Attn.: RFP 00–01) on or before 4:00 p.m., local time, Friday, Sep. 15, 2000. Proposal abstracts received after this time and date may not be reviewed. Upon review, NineSigma will provide written feedback on the likelihood of a full proposal being selected and the time and date for submission of a full proposal. Proposers not submitting proposal abstracts must submit an original and four (4) copies of the full proposal to NineSigma, P.O. Box 12521, Pittsburgh, PA 15241 before 4:00 p.m. EST, Friday, Aug. 4, 2000, in order to be considered.
EVALUATION CRITERIA
Evaluation of proposal abstracts and full proposals will be accomplished through a technical and business review of each proposal using the following criteria, which are listed in descending order of relative importance: (1) potential contribution and relevance to the sponsor's objectives; (2) overall scientific and technical merit; (3) plans and capability to accomplish technology development, (4) offeror's capabilities and related or past experience, and (5) cost-effort balance. The administrative addresses for this RFP are: Fax: (412) 222-2222 (Addressed to: NineSigma, RFP 00–01), e-mail: RFP00–01@ ninesigma.com NineSigma, Inc. This announcement and the Proposer Information Pamphlet may be retrieved ATTN: RFP 00- via the WWW at http://www.NineSigma.com in the RFP area. P.O. Box 12521 Pittsburgh, PA 15241

The RFP objectives and description identify the specific type of R&D support required. The program scope provides the budget and duration of the research, as well as R&D buyer contact information (unless the R&D buyer desires to remain anonymous). The general information includes a suggested outline for the R&D suppliers 120 to follow in submitting proposals. The evaluation criteria provide the R&D suppliers 120 with weighted criteria for how a decision will be made in choosing an R&D supplier. Criteria may include but not be limited to: number of years practicing the art or in business; the educational background and degrees of staff in an organization; past performance as judged by on-time and within-budget delivery of R&D product; and number of patents held by an individual or organization. Weighting would allow an R&D broker to assess the R&D buyer's relative concerns for each of the criteria. For example, a particular R&D buyer (perhaps working towards a strict deadline) may value on-time and within-budget delivery twice as much as either number of years in business, education of staff or the number of patents. On the other hand, another R&D buyer with a different need (perhaps in increasing the content and value of their intellectual property portfolio) may value number of patents and the education of staff each three times as much as either on-time and within-budget delivery or number of years in business.

In addition to developing a suitable RFP announcement 530, R&D broker 140 elicits questions from R&D buyer 110 that will help R&D broker 140 to evaluate potential R&D suppliers 120. For instance, R&D buyer 110 might be in competition with other players in the R&D community to develop certain areas of technology. In that case, R&D buyer 110 may not want to distribute an RFP announcement 530 prior to obtaining an executed non-disclosure statement from a particular R&D supplier 120. This option can be indicated on RFP record 224 using RFPConfidentiality indicator 540.

Another example of criteria that will assist R&D broker in evaluating potential R&D suppliers 120 might concern the type of R&D suppliers sought. For instance, R&D buyer 110 might not want universities to serve as R&D suppliers on a particular project. Or, an R&D buyer might want to ensure that a qualified R&D supplier is one that has been in the R&D business for two years or more. Or, because of past history with particular R&D suppliers, an R&D buyer might know of particular R&D suppliers to which it does not want to distribute an RFP announcement 530.

These exemplary types of evaluation criteria are preferably housed in the RFPConstraints field 595 on RFP record 224. RFPConstraints field 595 is flexible to accommodate whatever evaluation criteria is applicable to a particular R&D buyer's desired research activity, including but not limited to: the number of years practicing the art or in business; the educational background and degrees of staff in an organization; the type of organization (academic, government, non-profit or for-profit); past performance as judged by on-time and within-budget delivery of R&D product; the level and success of recent activity (the number of grants/contracts awarded within, say the last year or two years); equipment and facilities available for the R&D effort; the amount and mix of resources and expertise; and the number of patents held by an individual or organization.

Additionally, other RFP record fields preferably include information regarding the entity that R&D buyer chooses to have review the proposals (and abstracts) submitted by R&D suppliers 120. For instance, indicators 550 and 560 can be used to allow R&D buyer 110 the option to review the proposal information itself, or to employ an R&D broker 140 to review the proposal information, or to have broker 140 to assemble a review panel to review the proposal information. Indicators 580 and 590 are preferably employed to house information about the timeframes desired by R&D buyer 110 for obtaining the proposal abstracts and then the full proposals. If R&D buyer 110 opts to solicit only full proposals (and no abstracts), then RFPAbstractTargetDate 580 is preferably zeroed out to so indicate.

Once the RFP announcement 530 and the criteria for its evaluation have been developed, R&D broker 140 develops criteria for searching one or more supplier databases 275–278 (step 330). There are preferably different supplier databases for different general areas of technology. One database might contain information for R&D suppliers that provide services or supplies related to polymers. Another database might contain information for R&D suppliers that provide services or supplies related to active noise control. Each supplier database 275–278 suitably contains supplier records 225, as set forth in Table 5.

TABLE 5

| | | |
|---|---|---|
| 610 | SupplierID | The system number assigned to this R&D Supplier. |
| 620 | SupplierURL | The Universal Resource Locator that is the address of the R&D supplier's Web page. |
| 640 | SupplierWebContent | The first 255 bytes (characters) of data from the Web page at SupplierURL. |

Supplier databases 275–278 are preferably indexed on every word found in the Web page(s) addressable by SupplierURL 620 (every word that is not an article or preposition). Thus, there are thousands of indices for each supplier database, each index record 212 containing the following fields, as set forth in Table 6.

TABLE 6

| | | |
|---|---|---|
| 710 | IndexSupplierID | The R&D supplier whose Web page contains the keyword upon which this index is built. Each index is housed in sorted in order of IndexSupplierID. |
| 720 | IndexWeight | The number of times that the indexed keyword appears in the one or more Web pages addressable by SupplierURL 620. |

Referring also now to FIG. 4, an exemplary structure of one of the supplier databases depicts supplier database 275 and its multiple supplier records and indices. Having a specific supplier databases, one for each different general areas of technology, in combination with having all words from an R&D supplier 120's Web page indexed facilitates the retrieval of targeted, yet comprehensive information from the supplier databases by supplier identification program 227.

Preferably, R&D broker 140 is skilled to customize the search of one or more supplier databases 275–278 (step 340) to obtain an ordered result specific to the area of technology pertaining to the RFP announcement 530. The search process first involves determining which of the supplier databases to search. Supplier identification program 227 accepts a supplier database selection parameter for this purpose. The search process next involves the identification of a combination of keywords (usually technical terms specific to the area of technology pertaining to the RFP). In the exemplary embodiment, R&D broker 140 employs supplier identification program 227, which accepts a combination of keywords as input, when they are formatted in proper syntax to be recognized as Structured Query Language (SQL) statements. Alternatively, supplier identification program 227 might accept a combination of keywords as input using another industry standard query language or other type of search parameters.

Given the example that the R&D buyer 110 is seeking bids for R&D in the area of tunable optical filters, R&D broker 140 first employs the supplier identification program 227 to select from a list of available supplier databases. For this example, R&D broker 140 might choose a supplier database geared to telecommunications.

Once the R&D broker 140 indicates to supplier identification program 227 what supplier database to search, then R&D broker 140 enters an SQL statement that will return potential R&D suppliers. For instance, in this example, R&D broker 140 might decide to search on "optical filters" and "wavelength division multiplexing." In the exemplary embodiment, the search parameters that would be input to supplier identification program 227 would include but not be limited to: optical filters; etalons; interferometers; frequency-dependent filtering; non-linear optics; optoelectronic filters; and digital photonics.

Once the appropriate search parameters are entered, supplier identification program 227 first locates the appropriate indices for the supplier database being searched. An appropriate index is one that indexes what supplier records 225 in the supplier database being searched contain one of the words in the search parameter. There will be as many appropriate indices for a given search as there are unique keywords being searched. Each supplier database index is preferably sorted by IndexSupplierID 710, which facilitates supplier identification program 227 in processing more than one index at a time.

Supplier identification program 227 reads the index records from each appropriate index, and applies conventional Boolean rules to determine if the particular R&D supplier 120 associated with each IndexSupplierID 710 should be on the results list. If the supplier identification program 227 determines that the R&D supplier 120 should be included on the list, then a tally record is created for that R&D supplier 120. Each tally record 213 contains the following fields, as set forth in Table 7.

TABLE 7

| | | |
|---|---|---|
| 810 | TallySupplierID | The potential R&D supplier 120 that will be listed on the results list created by supplier identification program 227. |
| 820 | TallyWeight | The weight given the potential R&D supplier 120. The order of the potential R&D suppliers 120 on the results list created by supplier identification program 227 is based upon this value. |

For instance, if the search parameters are "optical filters" and "wavelength division multiplexing," then 5 indices of the telecommunications database are appropriate and will be employed by supplier identification program 227 to determine which supplier records 225 to list and in what order. The indices for "optical," "filter," "wavelength "'"division," and "multiplexing" are appropriate and are processed by supplier identification program 227 in order of IndexSupplierID 720.

Appropriate Boolean rules are applied based upon the search string. In case, the search is looking only for R&D suppliers which have Web content with (1) consecutive occurrences of the words "optical" and "filter" in that order, and (2) consecutive occurrences of "wavelength," "division," and "multiplexing" in that order. For this search, supplier identification program 227 processes through the 5 appropriate indices, determining which supplier records 225 meet these search criteria. If, and only if R&D identification program 227 determines that a particular R&D supplier 120 meets all the search criteria, then a tally record is created.

After processing all the appropriate indices, the tally database 279 is sorted by descending tally value. R&D identification program 227 then processes the ordered tally records, using the TallySupplierID 810 from each ordered tally record 213 to cross reference the corresponding supplier record 225 (matching TallySupplierID Id 810 to SupplierID 610) and to display the search results list, which is a list of potential R&D Suppliers 120. For each potential R&D supplier, supplier identification program 227 provides a SupplierURL 620, and the SupplierWebContent 640 (the first 255 characters of the content information housed on the supplier database from the associated URL).

A first exemplary search results list screen layout is seen in FIG. 7. Search results layout 700 shows the result of a search on a supplier database 275 using the query string "optical AND filtering." Nine hundred and eleven (911) potential R&D supplier records 225 were returned, with the most relevant records listed first (and in the exemplary embodiment of the search interface, five (5) records are displayed at one time). Each entry of the search results suitably contains information from supplier record 225, including the R&D supplier's Web address (URL) 620, and the first 255 bytes/characters of Web page content 630.

A second exemplary search results list screen layout is seen in FIG. 8. Search results layout 800 shows the result of a search on a supplier database 275 using the query string "wavelength AND division AND multiplexing." Three hundred and fourteen (314) potential R&D supplier records 225 were returned, with the most relevant records listed first. In this manner, supplier identification program 227 facilitates the R&D broker's evaluation of potential R&D suppliers 120.

Preferably, the R&D broker 140 examines all 1225 (911+ 314) records using the R&D supplier criteria developed for this particular RFP, and for example, may eliminate from consideration 1214 records (for example, because these records are from large companies not suited to be qualified R&D suppliers for this particular RFP or from small businesses without enough history or credibility), leaving a set of 11 qualified R&D suppliers 120, identified as suitable by R&D broker 140 and acceptable to R&D buyer 110.

Although supplier identification program 227 provides R&D broker 140 with an ordered list of potential R&D suppliers 120, R&D broker 140 is preferably skilled to further evaluate the list of potential R&D suppliers returned by supplier identification program 227. In the exemplary embodiment, R&D broker provides further manual evaluation of the potential R&D suppliers, based on the R&D buyer's evaluation criteria. For instance, if R&D buyer 110 does not desire that R&D suppliers 120 that are also universities, then R&D broker 140 must examine the list of potential R&D suppliers generated by supplier identification program 227 and eliminate those R&D suppliers 120 that are universities. However, supplier identification program 227 could also be programmed to do this elimination, or provide evaluation of other criteria automatically. The more criteria relevant to R&D buyer's choice of R&D suppliers that supplier identification program 227 can evaluate automatically, the quicker that R&D broker 140 can assemble a list of potential R&D suppliers 120.

When R&D broker 140 has assembled a list of potential R&D suppliers 120, R&D buyer 110 preferably approves the R&D suppliers 120 on the list to finalize them as "qualified" R&D suppliers (step 350). Once R&D buyer 110 has approved both the RFP announcement 530 and the list of qualified R&D suppliers 120, then R&D broker 140 solicits proposals or proposal abstracts from the qualified R&D suppliers 120 (step 360) by contacting each of them and providing each of them with a copy or RFP announcement 530.

In the exemplary embodiment, each qualified R&D supplier 120 for a particular R&D project has a proposal record 222 on proposal database 272. Proposal record 222 suitably includes information that allows R&D broker 140 to track communications to and from qualified R&D suppliers 120, in relation to a particular RFP. Add proposal program 228 creates a proposal record 222 for each qualified supplier 120 on the finalized list of qualified R&D suppliers. Each proposal record 222 preferably includes information about a particular R&D supplier 120 in connection with a particular RFP, as set forth in Table 8.

TABLE 8

| | | |
|---|---|---|
| 910 | ProposalSupplierID | The system number assigned to the R&D Supplier. |
| 920 | ProposalRFPID | The system number assigned to the RFP |
| 930 | ProposalDisclosure | Executed non-disclosure agreement, if one is required prior to distribution of RFP announcement. |
| 940 | ProposalContactInfo | Content of Returned Proposal contact information. |
| 950 | ProposalAbstract | Content of Returned Proposal Abstract, if Abstract Proposals are solicited. |
| 960 | ProposalAbstractApproved | Further qualification to solicit Full Proposal, if Abstract was solicited and Approved by R&D Buyer. |
| 970 | ProposalFull | Content of Returned Proposal. |

Information housed on proposal record 222 serves process 300 as follows. If RFPConfidentiality 540 indicates that each qualified R&D supplier 120 must sign a non-disclosure agreement prior to receiving a copy of RFPAnnouncement 530, then ProposalDisclosure 930 serves to house a copy of the executed agreement. Alternatively ProposalDisclosure 930 might merely be an indicator that an executed agreement is on file with R&D Broker 140 or R&D buyer 110.

ProposalContactInfo 940 can be employed by R&D broker 140 to keep track of when a proposal (and abstract proposal) is solicited from a qualified R&D supplier 120 and in what manner the contact took place. For instance, ProposalContactInfo 940 might house the e-mail address of the qualified R&D Supplier and a date of when the RFP announcement 530 was e-mailed.

ProposalAbstract 950 can be employed to house an abstract proposal returned from a qualified R&D supplier 120. R&D buyer 110 can opt for R&D broker 140 to initially solicit either abstract proposals or full proposals from qualified R&D suppliers 120. If RFPAbstractTargetDate is zero, then no abstract proposals will be solicited. However, if an abstract proposal is solicited, then ProposalAbstractApproved indicator 960 can be used to keep track of whether R&D buyer 110 desires to solicit a full proposal from the qualified R&D supplier 120. ProposalFull 970 is suitably employed to house the full proposal returned by the R&D supplier 120.

R&D broker 140 is preferably trained in evaluating proposals (step 370). R&D broker 140 provides R&D buyer 110 more than one option with regards to reviewing and evaluating proposals. One option is to forward all proposals returned by qualified R&D suppliers 120 to R&D buyer 110 and allow R&D buyer 110 to evaluate and decide upon which one or more qualified R&D suppliers 120 to contact. Alternatively, R&D broker 140 can assist in the process, either by reviewing and evaluating the proposals and then by advising R&D buyer 110, or by assembling a review panel.

A review panel is assembled with much flexibility. A review panel can consist of a mix of R&D buyer's agents (employees, or others), one or more R&D broker 140, and/or one or more R&D expert 170. R&D experts 170 are optionally employed to assist R&D buyers 110 in selecting R&D suppliers 120. If an R&D buyer 110 prefers to employ one or more R&D experts 170 to assist in choosing an R&D supplier 120, R&D brokers 140 employ matching system 130 to locate potential R&D experts 170. R&D experts 170 can be located by R&D broker 140 in much the same way that potential R&D suppliers are located, using supplier identification program 227. That is, because supplier databases 225–278 house information about researchers and research organizations worldwide, R&D experts 170 can also be found on supplier databases 225–228. In this manner, steps 330 through 350 also apply to locating R&D experts 170 who assist R&D buyer 110 in evaluating proposals to obtain the best mix of complementary R&D suppliers 120.

In summary, the present invention provides a system that enables quick, efficient, effective, comprehensive, interactive and confidential identification, qualification and matching of R&D buyers with R&D suppliers. R&D brokers extract sufficient information from an R&D buyer to prepare an RFP announcement, as well as criteria for evaluating whether potential R&D suppliers are qualified to submit proposals. R&D brokers develop search criteria for locating potential R&D suppliers on one or more R&D supplier databases, which house information about researchers and research organizations worldwide. The R&D broker searches the supplier database(s), evaluating the search results in accordance with the R&D buyer's evaluation criteria. The R&D broker provides a list of potential R&D suppliers to the R&D buyer, which approves a list of qualified R&D suppliers. The R&D broker contacts the qualified R&D suppliers, providing each R&D supplier with the RFP announcement, and inviting each to submit a proposal for supplying the R&D buyer with a proposal for the R&D requested in the announcement. The R&D broker provides timely feedback on proposals to the R&D suppliers so that the R&D suppliers have an opportunity to modify and resubmit proposals. The R&D broker also provides assistance to the R&D buyer in reviewing and evaluating submitted proposals to help R&D buyer attain the best mix of complementary qualified R&D suppliers to fulfill the R&D requested on the RFP.

The process is quick because one or more supplier databases house intelligently organized information that is specific to R&D suppliers in a particular area of technology. The process is efficient because the R&D brokers are preferably skilled in both the area of writing requests for proposals and in the area of technology specific to the R&D requested. The process is confidential because only qualified R&D suppliers are asked to submit proposals.

The foregoing is a description of preferred exemplary embodiments and best mode of the invention known to the applicant at the time of filing the application. The invention is not limited to the specific forms shown. Modifications may be made in the design and arrangement of the elements within the scope of the invention, as expressed in the appended claims.

What is claimed is:

1. A method for limiting disclosure of a first description of a project for at least one of research and development, the method comprising:

accessing aggregated first data describing a set of suppliers and aggregated second data describing the project to identify a first subset of the set of suppliers, each supplier of the first subset having a quantitative extent of correspondence between the respective aggregated first data and the aggregated second data;

determining the respective quantitative extent of correspondence and identifying the respective suppliers in the first subset utilizing the aggregated first data and the aggregated second data, the determining and identifying being performed by a stored computer program, wherein (1) aggregated first data describing the plurality of suppliers comprises for each supplier:
 (a) indicators of subject matter, wherein the subject matter is known to the supplier, and (b) quantitative indicators of supplier qualities including at least one of quantity of patents held, magnitude or quantity of grants received, and magnitude or quantity of contracts awarded; and (2) aggregated second data describing the project comprises:

(a) indicators of particular subject matter including at least one of particular subject matter to be invented, particular subject matter to be reduced to practice and particular subject matter for a commercial product; and (b) quantitative indicators of particular supplier qualities including at least one of desire minimum quantity of patents held, particular minimum magnitude or quantity of grants received, and particular minimum magnitude or quantity of contracts awarded;

reporting the first subset of suppliers for a first restricted distribution of the first description of the project for a buyer seeking a supplier having a desired capacity for at least one of inventing, reducing to practice, or developing the commercial product, the first description comprising the indicators of particular subject matter;

receiving a plurality of proposals, each respective proposal from a member of the first subset;

accessing the aggregated first data to identify a second subset of suppliers, each member of the second subset having indicators of particular subject matter known to the member corresponding to the indicators of particular subject matter; and providing a multiplicity of the plurality of proposals to a member of the second subset for identifying a supplier of the first subset to be eliminated from a second restricted distribution of a second description of the project.

2. The method of claim 1 further comprising aggregating the first aggregated data wherein aggregating comprises:

searching an information network to identify search results; and indexing the identified search results to provide keyword access.

3. The method of claim 2 wherein:

aggregating further comprises storing a record according to at least a portion of a message received from the information network; and indexing comprises analyzing the record.

4. The method of claim 1, further comprising conducting the first restricted distribution in accordance with the report.

5. The method of claim 1 wherein the report is ordered in accordance with the quantitative extent of correspondence.

6. A system for limiting disclosure of a first description of a project for at least one of research and development, the system comprising:

means for accessing aggregated first data describing a set of suppliers, wherein the aggregated first data describing the plurality of suppliers comprises for each supplier:

(1) indicators of subject matter, wherein the subject matter is known to the supplier; and (2) quantitative indicators of supplier qualities including at least one of quantity of patents held, magnitude or quantity of grants received, and magnitude or quantity of contracts awarded;

means for accessing aggregated second data describing the project to identify a first subset of the set of suppliers each supplier of the first subset having a quantitative extent of correspondence between the respective aggregated first data and the aggregated second data, wherein the aggregated second data describing the project comprises:

(1) indicators of particular subject matter including at least one of particular subject matter to be invented, particular subject matter to be reduced to practice and particular subject matter for a commercial product; and (2) quantitative indicators of particular supplier qualities including at least one of desire minimum quantity of patents held, particular minimum magnitude or quantity of grants received, and particular minimum magnitude or quantity of contracts awarded; and means for determining the respective quantitative extent of correspondence and identifying the respective supplier to the first subset utilizing the aggregated first data, the aggregated second data, and a stored computer program; and means for reporting the first subset of suppliers for a first restricted distribution of the first description of the project for a buyer seeking a supplier having a desired capacity for at least one of inventing, reducing to practice, or developing the commercial product, the first description comprising the indicators of particular subject matter;

means for receiving a plurality of proposals, each respective proposal from a member of the first subset;

means for accessing the aggregated first data to identify a second subset of suppliers, each member of the second subset having indicators of particular subject matter known to the member corresponding to the indicators of particular subject matter and means for providing a multiplicity of the plurality of proposals to a member of the second subset for identifying a supplier of the first subset to be eliminated from a second restricted distribution of a second description of the project.

7. The system of claim 6 further comprising means for aggregating the first aggregated data wherein aggregating comprises:

means for searching an information network to identify search results; and means for indexing the identified search results to provide keyword access.

8. The system of claim 7 wherein:

the means for aggregating further comprises means for storing a record according to at least a portion of a message received from the information network; and the means for indexing comprises means for analyzing the record.

9. The system of claim 6, further comprising means for conducting the first restricted distribution in accordance with the report.

10. The system of claim 6 wherein the report is ordered in accordance with the quantitative extent of correspondence.

11. The method of claim 1 wherein the aggregated second data describing the project is generated using the assistance of a broker.

12. The method of claim 11 wherein the broker receives one or more objectives of the project from the buyer via a network and utilizes the received objectives to generate at least a portion of the aggregated second data.

13. The method of claim 1 wherein a broker reviews at least one of the received proposals and provides feedback to the supplier associated with the reviewed proposal, and wherein the supplier modifies the reviewed proposal in response to the feedback.

* * * * *